United States Patent [19]

Nishino et al.

[11] Patent Number: 5,278,234

[45] Date of Patent: Jan. 11, 1994

[54] HIGH-NITRILE POLYMER COMPOSITION, MOLDED ARTICLE THEREOF, AND PROCESS FOR PRODUCING SAID COMPOSITION

[75] Inventors: Akio Nishino; Takeshi Miura, both of Hofu, Japan

[73] Assignee: Kanebo, Ltd., Tokyo, Japan

[21] Appl. No.: 618,244

[22] Filed: Nov. 27, 1990

[30] Foreign Application Priority Data

Nov. 27, 1989 [JP] Japan .................. 1-304838
Sep. 11, 1990 [JP] Japan .................. 2-241747
Sep. 11, 1990 [JP] Japan .................. 2-241748
Sep. 11, 1990 [JP] Japan .................. 2-241749
Sep. 17, 1990 [JP] Japan .................. 2-244156

[51] Int. Cl.$^5$ .................. C08L 9/02; C08L 33/18
[52] U.S. Cl. .................. 525/84; 525/86; 525/228; 525/230; 525/238; 525/242; 525/309; 525/310; 525/902; 523/201
[58] Field of Search .................. 525/84, 86, 228, 230, 525/238, 242, 309, 310, 902; 523/201

[56] References Cited

U.S. PATENT DOCUMENTS

| | | | |
|---|---|---|---|
| 2,776,270 | 1/1957 | Coover et al. | 525/238 |
| 2,958,670 | 11/1960 | Hare | 525/230 |
| 3,489,821 | 1/1970 | Witt et al. | 525/86 |
| 3,732,336 | 5/1973 | Duke et al. | 524/461 |
| 3,742,092 | 6/1973 | Duke et al. | 525/193 |
| 3,775,518 | 11/1973 | Endo | 525/310 |
| 3,793,405 | 2/1974 | Munzer et al. | 525/309 |
| 3,823,204 | 7/1974 | Okada et al. | 525/230 |
| 3,846,509 | 11/1974 | Saluti | 525/84 |
| 3,880,951 | 4/1975 | Ooya et al. | 525/84 |
| 3,914,337 | 10/1975 | Giddings et al. | 525/309 |
| 3,957,912 | 5/1976 | Cincera | 525/86 |
| 4,081,498 | 3/1978 | Maranci | 525/230 |
| 4,110,413 | 8/1978 | Kuhar | 525/309 |
| 4,127,614 | 11/1978 | Duke et al. | 525/309 |
| 4,151,224 | 4/1979 | Hendy et al. | 525/73 |
| 4,487,886 | 12/1984 | Dunning et al. | 525/86 |
| 4,504,605 | 3/1985 | Duke et al. | 523/201 |
| 4,771,107 | 9/1988 | Hoenl | 525/86 |

FOREIGN PATENT DOCUMENTS

2160639 6/1973 France .
2194731 3/1974 France .
2246594 5/1975 France .

*Primary Examiner*—Maurice J. Welsh
*Assistant Examiner*—Rabon Sergent
*Attorney, Agent, or Firm*—Flynn, Thiel, Boutell & Tanis

[57] ABSTRACT

A polymer composition comprising
2-50 parts by weight of a fine particles component dispersed in a matrix described later, of (1) a high-nitrile (co)polymer, wherein the proportion of the nitrile polymeric unit (a) is at least 86% by weight based on the total of the high-nitrile (co)polymer, and
98-50 parts by weight of a matrix of (2) a low-nitrile copolymer comprising the nitrile polymeric unit (a), the acrylic ester polymeric unit (b) and the aryl vinyl polymeric unit (c), wherein the proportion of the polymeric unit (a) is 50-85 % by weight and the polymeric unit (b) and the polymeric unit (c) occupy the remaining portion.

27 Claims, 2 Drawing Sheets

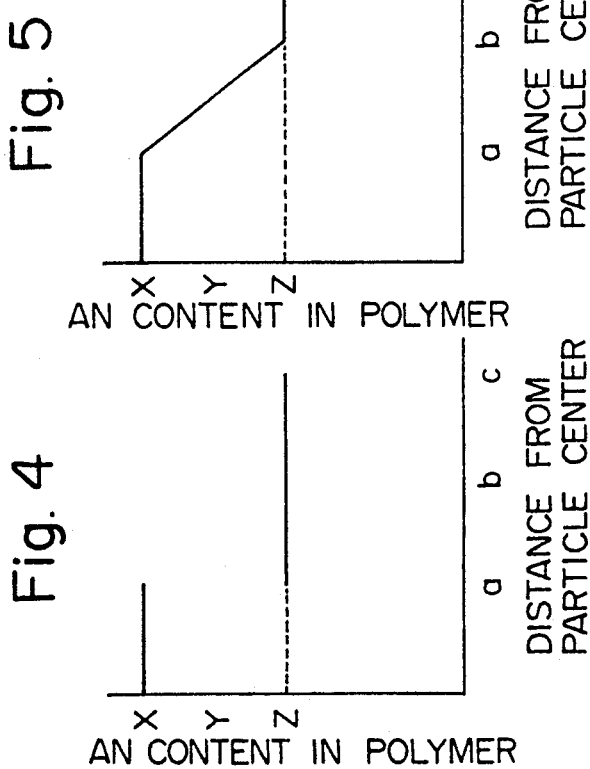

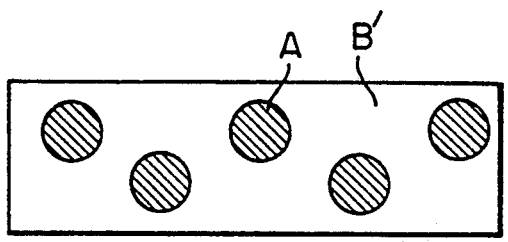
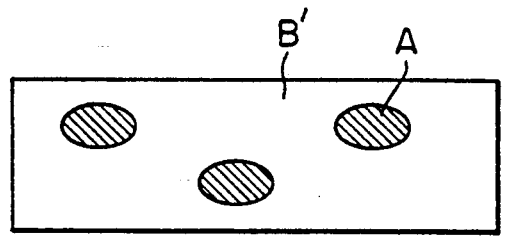
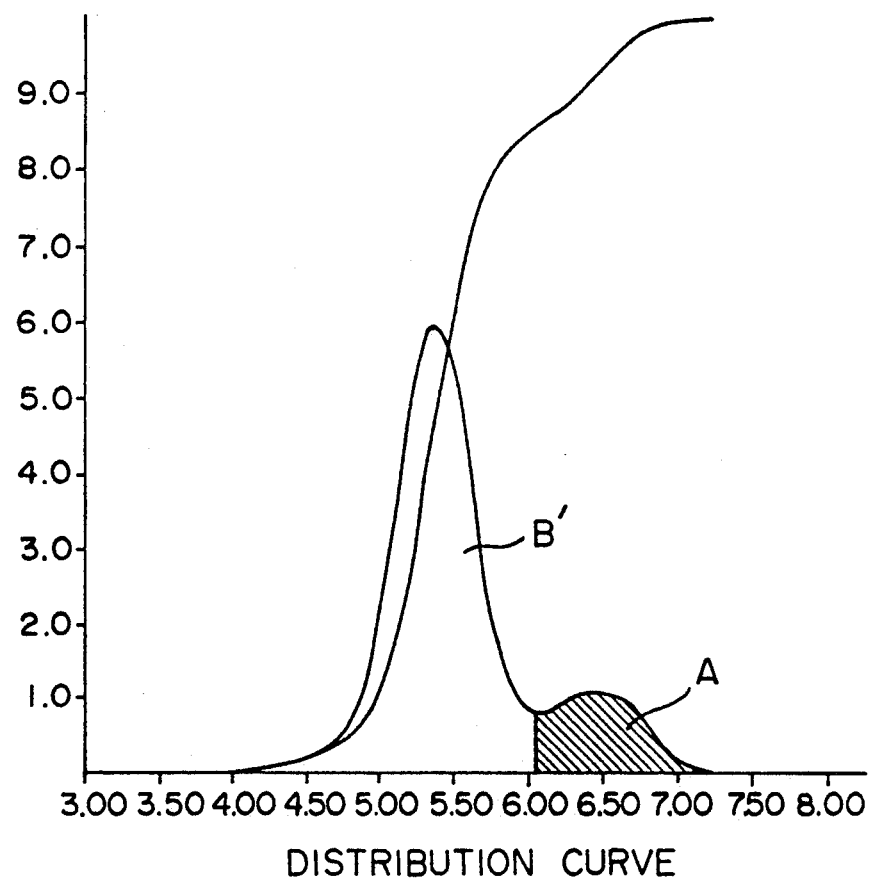
DISTRIBUTION CURVE

HIGH-NITRILE POLYMER COMPOSITION, MOLDED ARTICLE THEREOF, AND PROCESS FOR PRODUCING SAID COMPOSITION

BACKGROUND OF THE INVENTION

The present invention relates to a nitrile polymer composition, a molded article thereof, and a process for producing the composition. More particularly, the present invention relates to a novel nitrile polymer composition having an excellent melt-flow property and an excellent gas barrier property, a process for producing the same, and a molded article of the composition.

Nitrile resins containing an acrylonitrile or methacrylonitrile polymeric unit in an amount of 50% or more show excellent gas barrier property (high gas impermeability) owing to the inter-molecular bond unique to nitrile group. The nitrile resins are also excellent in chemical resistance (e.g. resistances to acids, alkalis, organic solvents) and mechanical properties (e.g. flexural modulus, tensile strength, creep resistance) and accordingly are balanced in properties. Because of these many advantageous properties, the nitrile resins are in wide use in food packaging films, sheets and materials for containers.

In recent years, a method for food storage not using any additive (e.g. antioxidant) has seen progress. Along with this movement, it is desired to develop a food packaging material having a higher gas barrier property. However, the development of such a food packaging material is not easy technically.

For example, the gas barrier property of acrylonitrile resin becomes generally higher as the acrylonitrile content in the resin becomes higher; meanwhile, acrylonitrile resins, when heated to temperatures higher than 200° C., cause cyclization owing to the intra-molecular condensation and resultantly are colored and infusibilized. Therefore, an acrylonitrile resin having an acrylonitrile content of 85% or more is virtually impossible to melt-mold.

Japanese Patent Publication No. 25005/1971 discloses a process for producing a thermoplastic nitrile polymer having low gas permeability. In this process, 100 parts by weight of a mixture consisting of (A) at least 70% by weight of an alpha,beta-olefinically unsaturated mononitrile such as acrylonitrile or the like and (B) 30% by weight or less of an olefinically unsaturated carboxylic acid ester such as methyl acrylate or the like is polymerized at 0°–100° C. in the presence of (C) 1–20 parts by weight of a copolymer of an olefinically unsaturated nitrile and a conjugated diene selected from the group consisting of butadiene and isoprene, in an aqueous medium in the presence of an emulsifier and a radical polymerization initiator in the absence of molecular oxygen. The nitrile polymer produced by the process contains a copolymer of a conjugated diene and an olefinically unsaturated nitrile, as mentioned above.

U.S. Pat. No. 3,742,092 discloses a process for producing a rubber-modified methacrylonitrile homo or copolymer having impact resistance, by polymerizing at least 80 parts by weight of methacrylonitrile and 0–20 parts by weight of a monomer selected from methyl acrylate, methyl methacrylate and styrene, in the presence of 1–40 parts by weight of a preformed diene rubber, 5–160 parts by weight of a seed polymer and a radical initiator. The seed polymer is a polymethacrylonitrile, a copolymer of methacrylonitrile and up to 20% by weight of other monovinyl monomer, a polystyrene, a polymethyl acrylate, a polymethyl methacrylate, a polyacrylonitrile, or a copolymer of acrylonitrile and other monovinyl monomer.

The above rubber-modified methacrylonitrile homo- or copolymer is also characterized by containing a diene rubber as mentioned above.

U.S. Pat. No. 3,732,336 discloses a process for producing a methacrylonitrile homo- or copolymer by emulsion-polymerizing at least 80 parts by weight of methacrylonitrile and 0–20 parts by weight of other monovinyl monomer in the presence of 5–160 parts by weight of a seed polymer and a radical initiator. As the seed polymer, there is used the same seed polymer as described in the above U.S. Pat. No. 3,742,092. The U.S. Pat. No. 3,732,336 describes that the process can give an improved polymerization rate, but the document gives no specific data regarding the production of a particulate polymer in which the seed polymer is a high-nitrile copolymer and the shell layer polymer is a low-nitrile copolymer.

Japanese Patent Application Kokai (Laid-Open) No. 69814/1986 proposes an acrylonitrile polymer whose molecular weight is made smaller (reduced viscosity = 1.0 or less) to enable melt molding, based on a general knowledge that acrylonitrile polymers generally have low melt moldability because of the high molecular weight.

Further, Japanese Patent Application Kokai (Laid-Open) No. 236210/1989 discloses, as a melt-moldable acrylonitrile polymer, an acrylonitrile polymer which has a reduced viscosity of 0.1–1.0 and an acetone-soluble content of 5–20% by weight.

Japanese Patent Application Kokai (Laid-Open) No. 62848/1973 discloses an acrylonitrile copolymer-graft rubber composition having low $CO_2$ permeability.

Japanese Patent Publication No. 21331/1984 discloses a polymer composition obtained by graft-polymerizing 80–95 parts by weight of a monomer such as acrylonitrile or the like in the presence of 5–20 parts by weight of a rubber, 100 parts by weight of which composition contains 2–40 parts by weight of a resin of the monomer grafted onto the rubber and 40–93 parts by weight of a matrix resin of the monomer.

Japanese Patent Application Kokai (Laid-Open) No. 167318/1989 discloses a high-nitrile resin obtained by grafting 60–99 parts by weight of a monomer mixture consisting of an unsaturated nitrile and an aromatic vinyl compound, onto 1–40 parts by weight of a diene synthetic rubber.

All of these proposed polymers and processes are characterized by using or producing a polymer containing a resin of high unsaturated nitrile content. Japanese Patent Publication No. 25005/1971 and Japanese Patent Application Kokai (Laid-Open) No. 62848/1973 are intended to effect graft polymerization in the presence of a rubber component to impart impact resistance and gas barrier property; U.S. Pat. No. 3,742,092 is intended to effect graft polymerization in the presence of a rubber component and a seed polymer to impart impact resistance and achieve improved polymerization rate; and U.S. Pat. No. 3,732,336 is intended to achieve improved polymerization rate by adding a seed polymer. All of these processes, however, are unable to obtain a resin composition well balanced in melt-flow property, gas barrier property and mechanical properties. Japanese Patent Publication No. 21331/1984 and Japanese Patent Application Kokai (Laid-Open) No.

167318/1989 are intended to effect two-stage polymerization to allow the polymer obtained by applying graft polymerization to a rubber component and the matrix polymer to have different compositions and thereby to impart solvent resistance, but the resulting polymers are insufficiently balanced in melt-flow property and gas barrier property. Japanese Patent Application Kokai (Laid-Open) 69814/1986 and Japanese Patent Application Kokai (Laid-Open) No. 236210/1989 are intended to obtain a polymer of reduced molecular weight to impart melt-flow property, but the resulting polymers inevitably have low mechanical properties.

An object of the present invention is to provide a rubber-containing high-nitrile polymer composition having excellent melt-flow property, gas barrier property and mechanical properties and a process for producing the composition.

Another object of the present invention is to provide a high-nitrile polymer composition melt-moldable to a film, a sheet, a bottle, a fiber, etc. and a process for producing the composition.

Still another object of the present invention is to provide a high-nitrile polymer molded article, having the properties of the above composition.

Other objects and advantages of the present invention will become apparent from the following description.

DETAILED DESCRIPTION OF THE INVENTION

The present inventors have studied nitrile resin and, as a result, found that a novel high-nitrile polymer composition and a molded article thereof, both well balanced in their melt-flow property, gas barrier property and mechanical properties, can be obtained by using, as a matrix polymer, a low-nitrile resin having a high melt-flow property and dispersing, in the matrix polymer, fine particles of a high-nitrile resin having low or no melt-flow property but having an excellent gas barrier property. The above finding has led to the completion of the present invention.

The first aspect of the present invention is a polymer composition comprising 2-50 parts by weight of a fine particles component dispersed in a matrix described later, of (1a) a nitrile polymer comprising a polymeric unit represented by the following formula (a)

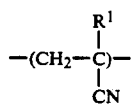

($R^1$ is a hydrogen atom or a methyl group), or (1b) a high-nitrile copolymer comprising the polymeric unit (a) and a polymeric unit presented by the following formula (b)

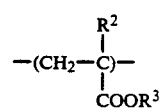

($R^2$ is a hydrogen atom or a methyl group, and $R^3$ is an alkyl group of 1-6 carbon atoms), wherein the proportion of the polymeric unit (a) is at least 86% by weight based on the total of the polymeric unit (a) and the polymeric unit (b), and 98-50 parts by weight of a matrix of (2a) a low-nitrile copolymer comprising the polymeric unit (a) and the polymeric unit (b), wherein the proportion of the polymeric unit (a) is 50-85% by weight based on the total of the polymeric unit (a) and the polymeric unit (b), or (2b) a low-nitrile copolymer comprising the polymeric unit (a) and a polymeric unit represented by the following formula (c)

($R^4$ is a hydrogen atom or a methyl group, and $R^5$ is a phenyl group), wherein the proportion of the polymeric unit (a) is 50-85% by weight based on the total of the polymeric unit (a) and the polymeric unit (c), or (2c) a low-nitrile copolymer comprising the polymeric unit (a), the polymeric unit (b) and the polymeric unit (c), wherein the proportion of the polymeric unit (a) is 50-85% by weight and the polymeric unit (b) and the polymeric unit (c) occupy the remaining portion, as well as a molded article obtained by subjecting said polymer composition to melt molding.

The second aspect of the present invention is a polymer composition comprising 3-50 parts by weight of a fine particles component dispersed in a matrix described later, comprising 1-15 parts by weight of (1a) a nitrile polymer comprising a polymeric unit represented by the following formula (a)

($R^1$ is a hydrogen atom or a methyl group), or (1b) a high-nitrile copolymer comprising the polymeric unit (a) and a polymeric unit presented by the following formula (b)

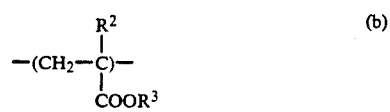

($R^2$ is a hydrogen atom or a methyl group, and $R^3$ is an alkyl group of 1-6 carbon atoms), wherein the proportion of the polymeric unit (a) is at least 86% by weight based on the total of the polymeric unit (a) and the polymeric unit (b), and 2-35 parts by weight of (1c) a graft polymer obtained by grafting 1-15 parts by weight of a nitrile polymer comprising the polymeric unit (a) or a high-nitrile copolymer comprising the polymeric unit (a) or a high-nitrile copolymer comprising the polymeric unit (a) and the polymeric unit (b), wherein the proportion of the polymeric unit (a) is at least 86% by weight based on the total of the polymeric unit (a) and the polymeric unit (b), onto 1-20 parts by weight of a synthetic rubber containing 50% by weight or more of a 1,3-conjugated diene, and 97-50 parts by weight of a matrix of (2a) a low-nitrile copolymer comprising the polymeric unit (a) and the polymeric unit (b), wherein the proportion of the polymeric unit (a) is 50-85% by weight based on the total of the polymeric unit (a) and the polymeric unit (b), or (2b) a low-nitrile copolymer comprising the polymeric unit (a) and a polymeric unit represented by the following formula (c)

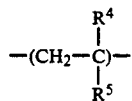

(R⁴ is a hydrogen atom or a methyl group, and R⁵ is a phenyl group), wherein the proportion of the polymeric unit (a) is 50-85% by weight based on the total of the polymeric unit (a) and the polymeric unit (c), or (2c) a low-nitrile copolymer comprising the polymeric unit (a), the polymeric unit (b) and the polymeric unit (c), wherein the proportion of the polymeric unit (a) is 50-85% by weight and the polymeric unit (b) and the polymeric unit (c) occupy the remaining portion, as well as a molded article obtained by subjecting said polymer composition to melt molding.

The third aspect of the present invention is a polymer composition according to the first or second aspect, wherein an intermediate layer exists between the matrix and the dispersed fine particle component, said intermediate layer being constituted by the same polymeric units as constituting the matrix and the proportion of the polymeric unit (a) in the intermediate layer being 50-85% by weight but being larger than the proportion of the polymeric unit (a) in the matrix, as well as a molded article obtained by subjecting said polymer composition to melt molding.

The fourth aspect of the present invention is a process for producing a polymer composition, which comprises (1) polymerizing a monomer represented by the following formula (a')

(R¹ is a hydrogen atom or a methyl group), to obtain a nitrile polymer (1a') as a core polymer or polymerizing the monomer (a') and a monomer represented by the following formula (b')

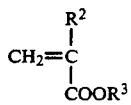

(R² is a hydrogen atom or a methyl group, and R³ is an alkyl group of 1-6 carbon atoms) to obtain a nitrile polymer (1b') as a core polymer wherein the proportion of the monomer component (a') is at least 86% by weight based on the total of the monomer components (a') and (b'), (2) in the presence of the core polymer, polymerizing the monomers (a') and (b') to obtain a low-nitrile copolymer (2a') as a shell layer polymer wherein the proportion of the monomer component (a') is 50-85% by weight based on the total of the monomer components (a') and (b'), or polymerizing the monomer (a') and a monomer represented by the following formula (c')

(R⁴ is a hydrogen atom or a methyl group, and R⁵ is a phenyl group), to obtain a low-nitrile copolymer (2b') as a shell layer polymer wherein the proportion of the monomer components (a') is 50-85% by weight based on the total of the monomer components (a') and (c'), or polymerizing the monomer (a'), the monomer (b') and the monomer (c') to obtain a low-nitrile copolymer (2c') as a shell layer polymer wherein the portion of the monomer component (a') is 50-85% by weight and the monomer components (b') and the monomer components (c'), occupy the remaining portion, and then (3) subjecting the resulting core-shell type polymer in particles to melt molding.

The fifth aspect of the present invention is a process for producing a polymer composition, which comprises (1) in the presence of a synthetic rubber containing 50% by weight or more of a 1,3-conjugated diene component, graft-polymerizing a monomer represented by the following formula (a')

(R¹ is a hydrogen atom or a methyl group), or the monomer (a') and a monomer represented by the following formula (b')

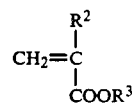

(R² is a hydrogen atom or a methyl group, and R³ is an alkyl group of 1-6 carbon atoms) to obtain a core polymer consisting of a nitrile polymer of the monomer (a') and a graft polymer in which said nitrile polymer has been grafted onto said synthetic rubber, or a core polymer consisting of a high-nitrile copolymer of the monomers (a') and (b') (in this copolymer, the proportion of the monomer component (a') is at least 86% by weight based on the total of the monomer components (a') and (b') and a graft polymer in which said high-nitrile copolymer has been grafted onto said synthetic rubber, (2) in the presence of the core polymer, polymerizing the monomers (a') and (b') to obtain a low-nitrile copolymer (2a') as a shell layer polymer wherein the proportion of the monomer component (a') is 50-85% by weight based on the total of the monomer components (a') and (b'), or polymerizing the monomer (a') and a monomer represented by the following formula (c')

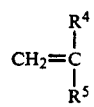

(R⁴ is a hydrogen atom or a methyl group, and R⁵ is a phenyl group), to obtain a low-nitrile copolymer (2b') as a shell layer polymer wherein the proportion of the monomer components (a') is 50-85% by weight based on the total of the monomer components (a') and (c'), or polymerizing the monomer (a'), the monomer (b') and the monomer (c') to obtain a low-nitrile copolymer (2c') as a shell layer polymer wherein the portion of the monomer component (a') is 50-85% by weight and the monomer components (b') and the monomer components (c') occupy the remaining portion, and then (3) subjecting the resulting core-shell type polymer in particles to melt molding.

The sixth aspect of the present invention is a process for producing a polymer composition, which comprises (1') in the above process of the fourth or fifth aspect, before the completion polymerization step (1) for obtaining a core polymer, adding continuously or in portions the monomers (a') and (b'), or (a') and (c'), or (a'), (b') and (c') to polymerize them and obtain a core polymer having an intermediate layer, said intermediate layer consisting of said monomer components and, in the intermediate layer, the proportion of the monomer component (a') being 50-85% by weight based on the total of the monomer components (a') and (b'), or (a') and (c'), or (a'), (b') and (c') and being larger than the proportion of the monomer component (a') in a shell layer polymer described later, (2') in the presence of the core polymer having an intermediate layer, polymerizing the monomers (a') and (b'), or (a') and (c'), or (a'), (b') and (c') to obtain a shell layer polymer consisting of a low-nitrile copolymer wherein the proportion of the monomer component (a') is 50-85% by weight based on the total of the monomer components (a') and (b'), or (a') and (c'), or (a'), (b') and (c'), and then (3') subjecting the resulting core-shell type multi-layer polymer in particles to melt molding.

The polymer composition of the present invention consists of a two-component or multi-component polymer phase constituted by a matrix of a low-nitrile copolymer and fine particles dispersed in said matrix, of a high-nitrile (co)polymer or a high-nitrile (co)polymer containing a synthetic rubber and a graft polymer, and has a sea-island structure. The polymer composition is derived from polymer particles of core-shell type multi-layer structure; the matrix polymer is derived from the shell polymer of said polymer particles; and the (co)polymer dispersed in a fine particles form in the matrix is derived from the core polymer of said polymer particles. The polymer composition of the present invention characterized in that the matrix and the fine particles dispersed therein have good adhesion to each other owing to the good adhesion of the core polymer and the shell polymer in the core-shell type structure, therefore, the composition is unlikely to give white blush marks, cracking, etc. at the time of stretch molding, and moreover the fine particles have excellent dispersibility in the matrix. Particularly in the case of the core-shell type multi-layer particles having an intermediate layer, the core and the shell layer have excellent adhesion to each other; and this adhesion between the core and the shell layer is even higher when the intermediate layer is a gradient type having such a compositional gradient as the portion of the intermediate layer closer to the core has a composition closer to that of the core and the portion of the intermediate layer closer to the shell layer has a composition closer to that of the shell layer.

The melt-flow property and mechanical properties of the polymer composition of the present invention vary largely depending upon the molecular weight of the matrix in the composition; the gas barrier property of the composition varies largely depending upon the composition of the fine particles dispersed in the matrix. The fine particles are dispersed in the matrix particularly preferably in a form extended in two directions (i.e. a planar form) by biaxial orientation.

The polymeric unit (a), (b) or (c) is derived from the monomer of the formula (a'), (b') or (c'). The monomer (a') is acrylonitrile or methacrylonitrile, and acrylonitrile is preferable. The monomer (b') is an alkyl acrylate or and alkyl methacrylate, and its examples include methyl acrylate, ethyl acrylate, propyl acrylate, butyl acrylate, amyl acrylate, hexyl acrylate, methyl methacrylate, ethyl methacrylate, propyl methacrylate, butyl methacrylate, amyl methacrylate and hexyl methacrylate. Of these, methyl acrylate is particularly preferable. The monomer (c') is styrene or alph-methylstyrene, and styrene is preferable. The monomer (a'), (b') or (c') may comprise, as necessary, other monomer copolymerizable therewith in an amount of less than 5% by weight. The other monomer includes, for example, neutral monomers such as vinyl acetate, acrylamide, vinyl ethyl ether, vinyl chloride, vinyldiene chloride and the like; acidic monomers such as acrylic acid, methacrylic acid, allylsulfonic acid, styrenesulfonic acid and the like; and ammonium or metal salts of said monomers.

The synthetic rubber used in the present invention can be a homopolymer of a conjugated diene monomer (e.g. 1,3-butadiene, isoprene, chloroprene), a copolymer of said dienes, or a copolymer of at least one of said dienes and other monomer (e.g. acrylonitrile, methacrylonitrile, styrene, methyl acrylate, methyl methacrylate). Preferably, the conjugated diene monomer(s) is (are), 1,3-butadiene or (and) isoprene and the other monomer is acrylonitrile, methacrylonitrile or styrene.

The synthetic rubber used in the present invention preferably contains conjugated diene monomer(s) in an amount of 50% by weight or more. It can be produced preferably by emulsion polymerization using an ordinary radical initiator, but the process for producing the synthetic rubber is not restricted particularly. The content of the synthetic rubber in the composition of the present invention is 1-20 parts by weight, preferably 2-15 parts by weight.

The high-nitrile polymer constituting the fine particles in the polymer composition of the first aspect of the present invention and also constituting the core of each core-shell type particle is a high-nitrile polymer consisting of at least 86% by weight, preferably 86-95% by weight, more preferably 87-92% by weight of the polymeric unit (a) based on the total of the polymeric unit (a) and the polymeric unit (b). The high-nitrile polymer constituting the fine particles in the composition and the core of each core-shell type particle has a reduced viscosity of 0.5-50 dl/g, preferably 1.0-40 dl/g, more preferably 2.0-30 dl/g as measured at 30° C. in dimethylformamide. The high-nitrile polymer has also a melt index of 2 g/10 min. or less, preferably 0.5 g/10 min. or less.

The shell layer consists of at least one layer. The polymer constituting the matrix in the polymer composition and also constituting the shell layer of each core-shell type particle, also consists of the polymeric unit (a) and the polymeric unit (b); however, the polymer contains the polymeric unit (a) in a smaller proportion than the polymer constituting the fine particles in the composition and the core of each core-shell particle does, i.e.

in a proportion of 50-85% by weight based on the total of the polymeric unit (a) and the polymeric unit (b), and accordingly is a low-nitrile polymer. The polymer constituting the matrix and the shell layer contains the polymeric unit (a) preferably in a proportion of 65-80% by weight, more preferably in a proportion of 70-80% by weight on the same basis.

The intermediate layer which exists between the matrix and the high-nitrile polymer fine particles in the composition or between the core polymer and the shell layer polymer in each core-shell type particle, contains the polymeric unit (a) in a proportion of 50-85% by weight based on the total of the polymeric unit (a) and the polymeric unit (b). This proportion of the polymeric unit (a) is larger than the proportion of the polymeric unit (a) in the matrix polymer or the shell layer polymer. The proportion of the polymeric unit (a) in the intermediate layer is preferably 65-80% by weight, more preferably 70-80% by weight. The intermediate layer may have a uniform composition or a composition of having a concentration gradient. Preferably, the proportion of the polymeric unit (a) in the intermediate layer is larger at the portion of the intermediate layer closer to each fine particle in the composition or to the core polymer of each core-shell type particle.

The fine particles in the composition and the core polymer, the matrix in the composition and the shell layer polymer, and the intermediate layer polymer are desired to further satisfy the following conditions.

(i) In the fine particles in the composition and the core polymer, the matrix in the composition and the shell layer polymer, and the intermediate layer polymer, the polymeric unit (a) is a polymeric unit consisting of acrylonitrile, the polymeric unit (b) is a polymeric unit consisting of methyl acrylate, and the polymeric unit (c) is a polymeric unit consisting of styrene.

The polymer composition as the first aspect of the present invention is desired to further satisfy at least one of the following conditions.

(i) The fine particles in the composition and the high-nitrile copolymer (core polymer) comprise 2-40% by weight, preferably 5-20% by weight of the composition and the core-shell type particles.

(ii) The polymer composition has a reduced viscosity of 0.3-5 dl/g, preferably 0.5-2 dl/g as measured at 30° C. in dimethylformamide.

(iii) The polymer composition has a melt index of 2-50 g/10 min. or less, preferably 3-25 g/10 min. at 200° C.

(iv) The content of the polymeric unit (a) in the fine particles in the composition as well as in the core polymer is higher than the content of the polymeric unit (a) in the matrix in the composition as well as in the shell layer polymer, by at least 2% by weight, preferably at least 5% by weight, more preferably at least 10% by weight. With respect to the average particle diameter of the core, the primary particles of the core have an average particle diameter of 0.02-0.8 μm, preferably 0.04-0.2 μm.

The polymer composition of the second aspect of the present invention is desired to further satisfy at least one of the following conditions.

(i) The graft polymer comprises 2-35% by weight, preferably 3-30% by weight of the composition. The degree of grafting of the graft polymer is preferably 20-200%.

(ii) The high-nitrile (co)polymer containing the graft polymer comprises 3-50% by weight, preferably 5-35% by weight of the composition.

(iii) The low-nitrile copolymer comprises 50-97% by weight, preferably 65-95% by weight of the composition.

(iv) The polymer composition has a reduced viscosity of 0.4-5 dl/g, preferably 0.5-2 dl/g as measured at 30° C. in dimethylformamide.

The polymer composition of the first aspect of the present invention can be produced by a so-called seed polymerization process. For example, the monomer of the formula (a') or the monomer mixture of the formula (a') and the formula (b') is emulsion-polymerized in an aqueous medium so that the proportion of the acrylonitrile component or/and methacrylonitrile component of the formula (a) in the resulting nitrile polymer or high-nitrile copolymer becomes 86-100% by weight based on the total of the polymeric unit (a) and the polymeric unit (b); then, using the resulting nitrile polymer or high-nitrile copolymer as a seed, emulsion polymerization is effected in an aqueous medium to produce a shell layer.

The polymer composition of the second aspect of the present invention can be produced by an emulsion graft polymerization process or the above-mentioned seed polymerization process. For example, the monomer of the formula (a') or the monomer mixture of the formula (a') and the formula (b') is subjected to emulsion graft polymerization in an aqueous medium in the presence of a rubber so that the proportion of the acrylonitrile component or/and methacrylonitrile component of the formula (a) in the resulting rubber-containing nitrile polymer or high-nitrile copolymer becomes 86-100% by weight based on the total of the polymeric unit (a) and the polymeric unit (b); then, using the resulting rubber-containing nitrile polymer or high-nitrile copolymer as a seed, emulsion polymerization is effected in an aqueous medium to produce a shell layer.

The core-shell type multi-layer particles having an intermediate layer can be produced as follows. First, core polymer particles are produced by polymerization; then, using these particles as a seed, seed polymerization is effected to produce an intermediate layer polymer consisting of a low-nitrile copolymer in which the proportion of the polymeric unit (a) is smaller than that in the core polymer; thereafter, using, as a seed, the core polymer particles each having an intermediate layer, seed polymerization is effected to produce a shell layer polymer consisting of a low-nitrile copolymer in which the proportion of the polymeric unit (a) is smaller than that in the intermediate layer. The core-shell type multi-layer particles having an intermediate layer which has a compositional gradient and whose proportion of polymeric unit (a) is larger at the portion closer to the core polymer, can be produced as follows. That is, before the completion of the polymerization step for producing a core polymer (at this timing, the unreacted monomer or monomer mixture for the core polymer still remains), a monomer mixture in which the proportion of the monomer (a') is smaller than that in said unreacted monomer or monomer mixture, is added continuously or in portions to produce an intermediate layer polymer by seed polymerization; then using, as a seed, the core polymer particles each having an intermediate layer, seed polymerization is effected to produce a shell layer polymer consisting of a low-nitrile copolymer in which the proportion of the polymeric unit (a) is smaller than that in the intermediate layer.

The thickness, amount and compositional gradient of the intermediate layer can be controlled by controlling the amount of polymerization in the polymerization step for the intermediate layer, or by controlling the rate of time of monomer addition when the monomer mixture for the intermediate layer is continuously added to the system where the unreacted monomer or monomer mixture for the core polymer still remains. The monomer mixture for the intermediate layer can be fed in one portion, in portions, or continuously; however, continuous feeding is preferable to carry out seed polymerization effectively.

The emulsifier used can be appropriately selected from known anionic emulsifiers, cationic emulsifiers and nonionic emulsifiers. The emulsifier concentration is important in seed polymerization and is about 0.1-2% by weight in the polymerization system. The emulsifier should neither be too much nor too little. When it is too much, particles of unintended polymers are formed, reducing the efficiency of the seed polymerization. When the emulsifier is too little, the emulsion stability is reduced, inviting agglomeration. Preferably, the emulsifier is added continuously. As the polymerization initiator, there can be used a known polymerization initiator. As the molecular weight modifier, there can be used a mercaptan or the like. The molecular weight modifier may or may not be used in the polymerization step for producing a core polymer, but is preferably used in an appropriate concentration in the polymerization step for producing a shell layer polymer. The polymer emulsion obtained by emulsion polymerization is subjected to removal of unreacted monomers, coagulation, water washing, dehydration and drying according to conventional methods; the resulting particles are mixed, as necessary, with a stabilizer, a pigment, etc. and subjected to melt extrusion to obtain a composition of the present invention in a form of, for example, pellets. Alternatively, the particles can be molded directly.

The polymer composition of the present invention is produced preferably from the core-shell type multilayer polymer particles of the present invention. Alternatively, the polymer composition can be produced, for example, by mixing a high-nitrile copolymer emulsion with a low-nitrile copolymer emulsion (the two emulsions are prepared separately) and applying the same treatment as mentioned above; however, this composition tends to give white blush marks, breakage, etc. at the time of orientation after molding.

The polymer composition obtained by the present invention can be subjected to melt molding easily by a known molding method such as extrusion molding, injection molding, extrusion blow, tubular film extrusion or the like. The polymer composition can be processed into primarily molded articles such as film, sheet, container and the like. It can further be subjected, by heating to secondary molding, for example, uniaxial orientation, simultaneous biaxial orientation, sequential biaxial orientation, pressure forming, vacuum forming, calender processing and heat setting. In this case, a known molding machine can be used. In molding, these may be added, so as to meet the application purpose of molded article: additives such as delustering agent, coloring agent, antioxidant, ultraviolet absorber and the like. The molded article obtained by subjecting the polymer composition to melt molding has a sea-island two-phase structure wherein the island phase consists of a high-nitrile (co)polymer and the sea phase consists of a low-nitrile copolymer. The high-nitrile (co)polymer is dispersed in the low-nitrile copolymer matrix, preferably in a form extended unidirectionally or bidirectionally (in this case, planar form) by orientation or the like to exhibit a good gas barrier property. This dispersion form is particularly preferred when the molded article is an orientated film or an oriented bottle.

The orientation temperature is suitably a temperature at which the high-nitrile (co)polymer is deformed easily, and must be at least higher than the glass transition temperature of the high-nitrile (co)polymer. When the orientation is conducted at such a low temperature at which the low-nitrile copolymer is oriented easily but the high-nitrile (co)polymer is difficult to orient, the resulting film gives white blush marks, breakage, etc. When the orientation is conducted under appropriate conditions, a substantially transparent film is obtained.

The molded article of the present invention, as compared with the conventional uniform copolymer having the same composition, is excellent in flexural strength, tensile elongation, of film, mechanical properties (e.g. strength, impact resistance), transparency, heat resistance and chemical resistance. That is, the composition of the present invention is excellent in processabilities such as melt moldability, thermal moldability and orientability and can be used as films for food packaging and containers for chemical reagents and cosmetics.

As described above, the polymer composition and molded article of the present invention are high in nitrile content, have good melt-flow property and thermal processability even in a high reduced viscosity range, are excellent in gas barrier property, tensile elongation of film and flexural strength of molded article, and accordingly are very useful in practical application. Further, the process of the present invention is easy to carry out in industry and accordingly is very useful in practical application.

BRIEF DESCRIPTION OF THE DRAWINGS

FIGS. 1, 2 and 3 are schematic illustrations of the core-shell type polymer particles of the present invention. A is a core consisting of a high-nitrile (co)polymer and B is a shell layer consisting of a low-nitrile copolymer. C and D are each an intermediate layer between the core and the shell layer, consisting of a low-nitrile copolymer. In the copolymer C, the acrylonitrile content is in a gradient from the acrylonitrile content of the core to the acrylonitrile content of the shell layer and is higher at the portion of the copolymer C closer to the core. In the copolymer D, the acrylonitrile content is intermediate between the acrylonitrile content of the core and the acrylonitrile content of the shell layer and is constant throughout the copolymer D.

FIG. 4, 5 and 6 are graphs showing the relations between the distance from a particle center and the acrylonitrile content of the polymer, of the core-shell type polymer particles of FIGS. 1, 2 and 3, respectively. a, b and c show the diameters of the core, the intermediate layer and the shell layer, respectively; and X, Y and Z show the acrylonitrile contents in the core, the intermediate layer and the shell layer, respectively.

FIGS. 7 and 8 each show a composition or molded article obtained by subjecting core-shell type polymer particles to melt molding.

FIG. 9 shows a molecular weight distribution curve of the composition of Example 1, obtained by GPC. A is a high-nitrile copolymer as a core; B' is a low-nitrile copolymer consisting of an intermediate layer and a shell layer (corresponding to the above B, C and D).

EXAMPLES

The present invention is hereinafter described more specifically with reference to Examples. In the Examples, parts and % are by weight, in all cases.

In the Examples, reduced viscosity, conversion, polymer composition, melt index (hereinafter abbreviated to MI), seed polymer content, average particle diameter of emulsion particles, oxygen permeability, flexural properties and film properties were measured according to the following methods.

Reduced Viscosity

A sample was dried sufficiently and dissolved in N,N-dimethylformamide (hereinafter abbreviated to DMF) at a concentration of 0.4 g/d. The resulting solution was measured for viscosity at 30° C., and reduced viscosity was determined by calculation of $\eta_{sp}/C$.

Conversion 1 ml of an emulsion obtained by polymerization was taken and diluted 10-fold with water. 20 µl of the resulting solution was poured into a vial. The vial was kept at 120° C. to effect vaporization. The resulting gas in the head space was fed into a gas chromatograph (GC-9A manufactured by Shimadzu) to analyze the remaining monomers. Conversion was calculated from the analysis. Conversion (%) is expressed as a polymer amount to total amount of monomers fed.

Polymer composition

A sample was sufficiently dried, then dissolved in dimethyl sulfoxide and deuterated dimethyl sulfoxide, and subjected to IR na $^1$H-NMR.

MI

Measured in accordance with ASTM D 1238. Conditions: temperature=200° C., load=12.5 kg, orifice diameter=2.1 mm$\phi$.

Seed polymer content

A GPC curve was obtained using the following apparatus and conditions. A molecular weight distribution curve was obtained from the GPC curve. When there was two mountains of a higher molecular weight, and a lower molecular weight, said content was expressed as the ratio of the area of the higher molecular weight mountain to the total area. When no separation into two mountains occurred, said content was calculated from the conversions of a seed polymer and a total polymer.

Apparatus: Liquid chromatograph (Model 590 manufactured by WATERS)

Column: KD-800P, KD-80M, KD-802 (Shodex manufactured by Showa Denko)

Solvent: DMF (0.01 N-LiBr)

Flow rate: 1 ml/min.

Temperature: 50° C.

Sample filtration: 0.5 µ-PTFE FILTER (MILLIPORE)

Amount fed: 0.1 ml

Detector: Deferential refractive index detector (R-401 manufactured by WATERS)

High-nitrile resin content

Calculated from the conversions of a seed polymer (core polymer) and a final polymer.

Graft resin content

A sample was is dissolved in acetonitrile/dimethylformamide (1:1) to separate the sample into a solvent-soluble resin component and a solvent-insoluble graft resin component. The solution was then subjected to centrifugation at 12,000 rpm for 20 minutes, and the contents of the respective resin components were measured. Graft resin content was calculated from said contents, the amount of a rubber fed, and the conversion of a final polymer.

Average particle diameter

Measured at 7,000 rpm using an automatic particle size distribution tester of ultracentrifuge type (CAPA-700 manufactured by Horiba Seisakusho).

Oxygen permeability

A sample (powder) was dried sufficiently and extruded at 170° C. by a melt extruder. The extrudate was pelletized by a pelletizer. The resulting pellets were subjected to melt molding at 180° C. to prepare a sheet. The sheet was biaxially oriented to obtain a film for measurement. The film was measured for oxygen permeability under conditions of 30° C. and 100% relative humidity, using an oxygen permeability tester (OX-TRAN-100 manufactured by Modern Controls).

Flexural properties

A test piece prepared by injection molding was measured for flexural modulus and flexural strength in according with ASTM D 790.

Film properties

A biaxially oriented film was measured for tensile strength and tensile elongation each in lengthwise and crosswise directions in accordance with ASTM D 638.

EXAMPLE 1

Production of core

A mixture consisting of the following components was fed into a stainless steel reactor. The reactor inside was sufficiently purged with nitrogen. Then, polymerization was effected at 60° C. for 1 hour with stirring.

| Water | 147.65 parts |
|---|---|
| Acrylonitrile | 30.0 parts |
| Methyl acrylate | 3.3 parts |
| Sodium persulafate | 0.04 part |
| Tetrapotassium-EDTA | 0.04 part |
| Monogen Y100* | 0.64 part |

(*As salt of natural alchohol-sulfuric acid ester, manufactured by Daiichi Kogyo Seiyaku)

After the polymerization, conversion and the properties (e.g. reduced viscosity) of the resulting polymer were measured.

The results are shown in Table 1.

Seed polymerization

To the system after the above polymerization was dropwise added, continuously in 3 hours, a mixture consisting of the following components. (Production of intermediate layer)

| Water | 82.05 parts |
|---|---|
| Acrylonitrile | 50 parts |

| | |
|---|---|
| Methyl acrylate | 16.67 parts |
| n-Dodecyl mercaptan | 2.5 parts |
| Sodium persulafate | 0.02 part |
| Tetrapotassium-EDTA | 0.02 part |
| Monogen Y100 | 0.36 part |

After the dropwise addition, polymerization was continued for a further 4 hours at 60° C. (production of shell layer) The properties (e.g. conversion) of the resulting emulsion are shown in Table 1. The remaining monomers were removed from this emulsion, and the resulting emulsion was subjected to salting out (coagulation) with aluminum sulfate to obtain a polymer powder.

The polymer powder was sufficiently dried and extruded at 170° C. into strands by a melt extruder. The strands were pelletized by a pelletizer. The pellets were measured for physical properties. The results (the properties of a polymer composition) are shown in Table 1.

EXAMPLE 2

Production of core 0.5 part of n-dodecyl mercaptan was added to the components used in Example 1 (production of core). The resulting mixture was subjected to the same procedure as in Example 1 (production of core). The properties of the resulting polymer are shown in Table 1.

Seed polymerization

There was repeated the same procedure as in Example 1 (seed polymerization) except that the amount of n-dodecyl mercaptan was changed to 2.0 parts, to obtain a polymer in chips. The properties of the polymer are shown in Table 1.

EXAMPLE 3

Production of core

Polymerization was effected in the same manner as in Example 1 (production of core). The properties of the resulting polymer are shown in Table 1.

Seed polymerization

There was repeated the same procedure as in Example 1 (seed polymerization) except that the amount of acrylonitrile was changed to 55.3 parts and the amount of methyl acrylate was changed to 11.4 parts, to obtain a polymer in chips. The properties of the polymer are shown in Table 1.

EXAMPLE 4

Production of seed polymer

The same procedure as in Example 1 (production of core) except that the polymerization time was changed to 8 hours. The resulting emulsion was taken out. The properties of the polymer obtained are shown in Table 1.

Seed polymerization 40.4 parts of the above seed emulsion was added to the same mixture as used in Example 1 (seed polymerization). The resulting mixture, was subjected to the same procedure as in Example 1 (seed polymerization) to obtain a polymer in chips. The properties of the polymer are shown in Table 1.

EXAMPLE 5

Production of core

There was repeated the same procedure as in Example 1 (production of core) except that the amount of acrylonitrile was changed to 31.7 parts and the amount of methyl acrylate was changed to 1.6 parts. The properties of the polymer are shown in Table 1.

Seed polymerization

There was effected in the same manner as in Example 1 (seed polymerization) except that the amount of acrylonitrile was changed to 483 parts and the amount of methyl acrylate was changed to 18.4 parts. The properties of the polymer are shown in Table 1.

EXAMPLE 2

Production of core

There was repeated the same procedure as in Example 1 (production of core) except that the polymerization time was changed to 1 hour and 30 minutes. The properties of the polymer are the resulting polymer are shown in Table 1.

Seed polymerization

There was repeated the same procedure as in Example 1 (seed polymerization). The properties of the polymer are shown in Table 1.

COMPARATIVE EXAMPLE 1

Production of core

A mixture consisting of the following components was fed into a stainless steel reactor. The reactor inside was sufficiently purged with nitrogen. Then, polymerization was effected at 60° C. for 1 hours with stirring.

| | |
|---|---|
| Water | 147.65 parts |
| Acrylonitrile | 25 parts |
| Methyl acrylate | 8.33 parts |
| Sodium persulafate | 0.04 part |
| Tetrapotassium-EDTA | 0.04 part |
| Monogen Y100 | 0.64 part |
| n-Dodecyl mercaptan | 0.83 part |

The properties of the resulting polymer are shown in Table 1.

Seed polymerization

To the system after the above polymerization was dropwise added, continuously in 3 hours, a mixture consisting of the following components.

| | |
|---|---|
| Water | 82.05 parts |
| Acrylonitrile | 50 parts |
| Methyl acrylate | 16.67 parts |
| n-Dodecyl mercaptan | 1.67 part |
| Sodium persulafate | 0.02 part |
| Tetrapotassium-EDTA | 0.02 part |
| Monogen Y100 | 0.36 part |

After the completion of the dropwise addition, polymerization was effected at 60° C. for a further 4 hours. The properties (e.g. conversion) of the resulting emulsion are shown in Table 1. Then, the same procedure as in Example 1 was eperted to obtain a polymer in chips. The properties of the polymer are shown in Table 1.

COMPARATIVE EXAMPLE 2

Production of core

There was repeated the same procedure as in comparative Example 1 (production of core) except that the amount of acrylonitrile, methyl acrylate and n-dodecyl mercaptan were changed to 26.67 parts, 6.67 parts and 1.39 parts, respectively. The properties of the resulting polymer are shown in Table 1.

Seed polymerization

There was repeated, the same procedure as in Comparative Example 1 (seed polymerization) except that the amounts of acrylonitrile, methyl acrylate and n-dodecyl mercaptan were changed to 53.33 parts, 13.33 parts and 2.78 parts, respectively. The properties of the polymer are shown in Table 1.

COMPARATIVE EXAMPLE 3

Production of core

There was repeated the same procedure as in Example 1 (production of core) except that the amounts acrylonitrile, methyl acrylate were changed to 25 parts and 8.33 parts, respectively and the polymerization time was changed to 1 hours and 30 minutes. The properties of the resulting polymer are shown in Table 1.

Seed polymerization

There was repeated the same procedure as in Example 1 (seed polymerization) except that the amounts of acrylonitrile, methyl acrylate were changed to 50 parts and 16.67 parts, respectively. The properties of the resulting polymer are shown in Table 1.

COMPARATIVE EXAMPLE 4

Production of core

There was repeated the same procedure as in
Example 1 (production of core) except that the amounts of acrylonitrile, methyl acrylate were changed to 26.67 parts and 6.67 parts, respectively and the polymerization time was changed to 1 hours and 30 minutes. The properties of the resulting polymer are shown in Table 1.

Seed polymerization

There was repeated the same procedure as in Example 1 (seed polymerization) except that the amounts of acrylonitrile, methyl acrylate were changed to 53.33 parts and 13.33 parts, respectively. The properties of the polymer are shown in Table 1.

COMPARATIVE EXAMPLE 5

58.2 parts of the emulsion obtained in Example 4 (production of seed polymer) was mixed with 333.3 parts of an emulsion obtained in the same manner as in Comparative Example 1. The remaining monomers were removed. Then, there was repeated the same procedure as in Example 1 to obtain a polymer in chips. The properties of the resulting polymer are shown in Table 1.

EXAMPLE 7

The chips of Example 1 were injection-molded to obtain test pieces for flexural modulus and flexural strength. The chips were also melt-molded at 180° C. by an extruder having a T-shaped die to prepare a sheet of 300 $\mu$m in thickness. The sheet was subjected to simultaneous biaxial orientation in lengthwise and crosswise directions at 105° C. using a tender biaxial stretching machine, to obtain a biaxially oriented film of 50 $\mu$m in thickness. The film was measured for flexural modulus, flexural strength, tensile strength and tensile elongation. The results are shown in Table 5.

COMPARATIVE EXAMPLE 6

There was repeated the same procedure as in Example 7 except that the polymer was obtained in the same manner as in Comparative Example 2. The results are shown in Table 5.

COMPARATIVE EXAMPLE 7

There was repeated the same procedure as in Example 7 except that the polymer was obtained in the same manner as in Comparative Example 5. The results are shown in Table 5.

EXAMPLE 8

There was repeated the same procedure as in Example 1 (production of core) except that 10.3 parts of NIPOL-1551 (an acrylonitrile-butadiene rubber latex (solid content=51%) manufactured by Nippon Zeon Co., Ltd.) was added to the components of Example 1 (Production of core).

The properties (e.g. conversion) of the emulsion obtained and the properties of the polymer (polymer composition) obtained are shown in Table 2.

EXAMPLE 9

Production of core

There was repeated the same procedure as in Example 8 (production of core) except that the amount of NIPOL-1551 was changed to 21.8 parts. The properties of the resulting polymer are shown in Table 2.

Seed polymerization

Seed polymerization was effected in the same manner as in Example 8 (seed polymerization). The properties of the resulting polymer are shown in Table 2.

EXAMPLE 10

Production of core

There was repeated the same procedure as in Example 8 except that the amount of acrylonitrile and methyl acrylate were changed to 31.7 parts and 1.6 parts, respectively. The properties of the resulting polymer are shown in Table 2.

Seed polymerization

Seed polymerization was effected in the same manner as in Example 8 except that the amounts of acrylonitrile and methyl acrylate were changed to 48.3 parts and 18.4 parts, respectively. The properties of the resulting polymer are shown in Table 2.

EXAMPLE 11

Production of core

Polymerization was effected in the same manner as in Example 8 (polymerization of core). The properties of the resulting polymer are shown in Table 2.

Seed polymerization

There was repeated the same procedure as in Example 8 (seed polymerization) except that the amounts of acrylonitrile and methyl acrylate were changed to 55.3 parts and 11.4 parts, respectively. The properties of the resulting polymer are shown in Table 2.

COMPARATIVE EXAMPLE 8

Production of core

A mixture consisting of the following components was fed into a stainless steel reactor. The reactor inside was sufficiently purged with nitrogen, after which polymerization was effected at 60° C. for 1 hour with stirring.

| | |
|---|---|
| NIPOL-1551 | 10.3 parts |
| Water | 147.65 parts |
| Acrylonitrile | 25 parts |
| Methyl acrylate | 8.33 parts |
| Sodium persulafate | 0.04 part |
| Tetrapotassium-EDTA | 0.04 part |
| Monogen Y100 | 0.64 part |
| n-Dodecyl mercaptan | 1.1 parts |

The properties of the resulting polymer are shown in Table 2.

Seed polymerization

To the system after the above polymerization was dropwise added, in 3 hours, a mixture consisting of the following components.

| | |
|---|---|
| Water | 82.05 parts |
| Acrylonitrile | 50 parts |
| Methyl acrylate | 16.67 parts |
| n-Dodecyl mercaptan | 2.2 parts |
| Sodium persulafate | 0.02 part |
| Tetrapotassium-EDTA | 0.02 part |
| Monogen Y100 | 0.36 part |

After the dropwise addition, the mixture was subjected to polymerization by aging at 60° C. for 4 hours. The properties (e.g. conversion) of the resulting emulsion are shown in Table 2. Then, the same procedure as in Example 8 was repeated to obtain a polymer in chips. The properties of the polymer are shown in Table 2.

COMPARATIVE EXAMPLE 9

Production of core

There was repeated, the same procedure as in Comparative Example 8 (production of core) except that the amount of NIPOL-1551 was changed to 21.8 parts. The properties of the resulting polymer are shown in Table 2.

Seed polymerization

Seed polymerization was effected, in the same manner as in Comparative Example 8 (seed polymerization). The properties of the resulting polymer are shown in Table 2.

EXAMPLE 12

There was repeated the same procedure as in Example 7 except that the chips of Example 8 were used. The result shown in Table 5.

COMPARATIVE EXAMPLE 10

There was repeated the same procedure as in Example 12 except that the polymer was obtained in the same manner as in Comparative Example 8. The result shown in Table 5.

EXAMPLE 13

Production of core

A core polymer was produced by the same polymerization as in Example 1. The properties of the polymer are shown in Table 3.

Seed polymerization

To the system after the above polymerization was dropwise added, continuously in 3 hours, the same mixture as used in Example 1 (seed polymerization) except that methyl acrylate was changed to styrene. (Production of intermediate layer)

After the completion of the dropwise addition, the polymerization was continued at 60° C. for further 1 hour. The properties (e.g. conversion) of the resulting emulsion are shown in Table 3.

Further, the same procedure as in Example 1 was repeated. Then, the resulting polymer was extruded into strands at 190° C. by a melt extruder. The strands were pelletized by a pelletizer. The properties of the polymer (polymer composition) are shown in Table 3.

EXAMPLE 14

Production of core 0.5 part of n-dodecyl mercaptan was added to the components of Example 13 (production of core). The resulting mixture was subjected to the same procedure as in Example 13 (production of core). The properties of the resulting polymer are shown in Table 3.

Seed polymerization

There was repeated the same procedure as in Example 13 (seed polymerization) except that the amount of n-dodecyl mercaptan was changed to 2.0 parts, to obtain a polymer in chips. The properties of the polymer are shown in Table 3.

EXAMPLE 15

Production of core

Polymerization was effected in the same manner as in Example 13 (production of core) except that the amounts of acrylonitrile and methyl acrylate were changed to 31.7 parts and 1.6 parts, respectively. The properties of the resulting polymer are shown in Table 3.

Seed polymerization

Polymerization was effected in the same manner as in Example 13 (seed polymerization) except that the amounts of acrylonitrile and methyl acrylate were changed to 46.7 parts and 20.0 parts, respectively. The properties of the polymer are shown in Table 3.

EXAMPLE 16

Production of seed polymer

Polymerization was effected in the same manner as in Example 13 (production of core) except that the polymerization time was changed to 8 hours. The resulting emulsion was taken out. The properties of the resulting polymer are shown in Table 3.

Seed polymerization 40.4 part of the above seed emulsion was added to the same mixture as in Example 13 (seed polymerization). The resulting mixture was subjected to the same procedure as in Example 13 to obtain a polymer in chips. The properties of the polymer are shown in Table 3.

EXAMPLE 17

Production of core

There was repeated the same procedure as in Example 13 (production of core) except that the polymerization time was changed to 1 hour and 30 minutes. The properties of the resulting polymer are shown in Table 3.

Seed polymerization

Polymerization was effected in the same manner as in Example 13 (seed polymerization). The properties of the polymer are shown in Table 3.

COMPARATIVE EXAMPLE 11

Production of core

A mixture consisting of the following components was fed into a stainless steel reactor. The reactor inside was sufficiently purged with nitrogen, after which polymerization was effected at 60° C. for 1 hours with stirring.

| Water | 147.65 parts |
|---|---|
| Acrylonitrile | 10 parts |
| Styrene | 1.11 parts |
| Sodium persulafate | 0.04 part |
| Tetrapotassium-EDTA | 0.04 part |
| Monogen Y100 | 0.64 part |

The properties of the resulting polymer are shown in Table 3.

Seed polymerization

To the system after the above polymerization was dropwise added, continuously in 3 hours, a mixture consisting of the following components.

| Water | 82.05 parts |
|---|---|
| Acrylonitrile | 66.67 parts |
| Styrene | 22.22 parts |
| n-Dodecyl mercaptan | 2.5 parts |
| Sodium persulafate | 0.02 part |
| Tetrapotassium-EDTA | 0.02 part |
| Monogen Y100 | 0.36 part |

After the dropwise addition, polymerization was effected at 60° C. for a further 1 hour. The properties (e.g. conversion) of the resulting emulsion are shown in Table 3. The emulsion was subjected to the same procedure as in Example 13 to obtain a polymer in chips. The properties of the polymer are shown in Table 3.

COMPARATIVE EXAMPLE 12

Production of core

There was repeated the same procedure as in Comparative Example 11 (production of core) except that the amounts of acrylonitrile, methyl acrylate and n-dodecyl mercaptan were changed to 23.34 parts, 10 parts and 0.5 parts, respectively. The properties of the resulting polymer are shown in Table 3.

Seed polymerization

There was repeated the same procedure as in Comparative Example 11 (seed polymerization) except that the amounts of acrylonitrile, styrene and n-dodecyl mercaptan were changed to 50 parts, 16.67 parts and 2.0 parts, respectively. The properties of the resulting polymer are shown in Table 3.

COMPARATIVE EXAMPLE 13

Production of core

There was repeated the same procedure as in Comparative Example 11 (production of core) except that the amount of n-dodecyl mercaptan was changed to 0.83 parts. The properties of the resulting polymer are shown in Table 3.

Seed polymerization

The same procedure as in Comparative Example 11 (seed polymerization) was repeated. The properties of the resulting polymer are shown in Table 3.

COMPARATIVE EXAMPLE 14.

58.2 parts of the emulsion obtained in Example 16 (production of seed polymer) was mixed with 333.3 parts of an emulsion obtained in the same manner as in Comparative Example 13. The remaining monomers were removed, after which salting out was effected. Then, the same procedure as in Example 13 was repeated to obtain a polymer in chips. The properties of the resulting polymer are shown in Table 3.

EXAMPLE 18

The chips of Example 13 were injection-molded to obtain test pieces for flexural modulus and flexural strength. The chips were also melt-molded at 200° C. by an extruder having a T-shaped die to prepare a sheet of 300 μm in thickness. The sheet was subjected to simultaneous biaxial orientation in lengthwise and crosswise directions at 120° C. using a tender biaxial stretching machine, to obtain a biaxially oriented film of 60 μm in thickness. The film was measured for flexural modulus, flexural strength, tensile strength and tensile elongation. The results are shown in Table 5.

COMPARATIVE EXAMPLE 15

There was repeated the same procedure as in Example 18 except that the polymer was obtained in the same manner as in Comparative Example 14. The results are shown in Table 5.

EXAMPLE 19

Production of core

The same procedure as in Example 8 (production of core) was repeated. The results are shown in Table 4.

Seed polymerization

To the above core was applied the same procedure as in Example 13 (seed polymerization). The properties of the resulting polymer (polymer composition) are shown in Table 4.

EXAMPLE 20

Production of core

The same procedure as in Example 19 (production of core) was repeated except that the amount of NIPOL- 1551 was changed to 21.8 parts. The properties of the resulting polymer are shown in Table 4.

Seed polymerization

The same procedure as in Example 19 (seed polymerization) was repeated. The properties of the resulting polymer are shown in Table 4.

EXAMPLE 21

Production of core

The same procedure as in Example 19 (production of core) was repeated except that the amounts of acrylonitrile and methyl acrylate were changed to 31.7 parts and 1.6 parts, respectively. The properties of the resulting polymer are shown in Table 4.

Seed polymerization

The same procedure as in Example 19 (seed polymerization) was repeated except that the amounts of acrylonitrile and styrene was changed to 46.67 parts and 20 parts, respectively. The properties of the resulting polymer are shown in Table 4.

EXAMPLE 22

Production of core

The same procedure as in Example 19 (production of core) was repeated except that the polymerization time was changed to 1.5 hours.

Seed polymerization

The same procedure as in Example 19 (seed polymerization) was repeated. The properties of the resulting polymer are shown in Table 4.

COMPARATIVE EXAMPLE 16

Production of core

A mixture consisting of the following components was fed into a stainless steel reactor. The reactor inside was sufficiently purged with nitrogen, after which polymerization was effected at 60° C. for 1 hour with stirring.

| | |
|---|---|
| NIPOL-155 | 10.3 parts |
| Water | 147.65 parts |
| Acrylonitrile | 10 parts |
| Styrene | 1.11 parts |
| Sodium persulafate | 0.04 part |
| Tetrapotassium-EDTA | 0.04 part |
| Monogen Y100 | 0.64 part |

The properties of the resulting polymer are shown in Table 4.

Seed polymerization

The same procedure as in Example 19 (seed polymerization) was repeated. The properties of the resulting polymer are shown in Table 4.

COMPARATIVE EXAMPLE 17

Production of core

The same procedure as in Example 19 (production of core) was repeated except that the amounts of acrylonitrile and methyl acrylate were changed to 23.3 parts and 10.0 parts, respectively. The properties of the resulting polymer are shown in Table 4.

Seed polymerization

The same procedure as in Example 19 (seed polymerization) was repeated except that the amounts of acrylonitrile and styrene was changed to 53.3 parts and 13.3 parts, respectively. The properties of the resulting polymer are shown in Table 4.

EXAMPLE 23

The same procedure as in Example 18 was repeated except the chips of Example 19 were used. The results are shown in Table 5.

COMPARATIVE EXAMPLE 18

The same procedure as in Example 23 was repeated except that a polymer was obtained in the same manner as in Comparative Example 17. The results are shown in Table 5.

TABLE 1

(a)

| | Core polymer | | | | | | Shell layer polymer[1] | |
|---|---|---|---|---|---|---|---|---|
| | Conversion (%) | Average particle diameter (μm) | Polymer composition (%)[2] AN | MA | MI (g/10 min) | Reduced viscosity (dl/g) | Polymer composition (%)[2] AN | MA |
| Example 1 | 10.6 | 0.06 | 90.1 | 9.9 | 0.0 | 18.90 | 79.2 | 20.8 |
| Example 2 | 10.3 | 0.07 | 90.3 | 9.7 | 0.0 | 0.54 | 78.8 | 21.2 |
| Example 3 | 10.5 | 0.08 | 90.0 | 10.0 | 0.0 | 18.90 | 82.2 | 17.8 |
| Example 4 | [3](98.9) | 0.13 | 90.0 | 10.0 | 0.0 | 16.00 | 75.6 | 24.4 |
| Example 5 | 11.2 | 0.06 | 94.7 | 5.3 | 0.0 | 15.00 | 78.2 | 21.8 |
| Example 6 | 15.9 | 0.06 | 90.0 | 10.0 | 0.0 | 18.50 | 78.6 | 21.4 |
| Comparative Example 1 | 20.0 | 0.07 | 75.1 | 24.9 | 15.0 | 0.50 | 75.0 | 25.0 |
| Comparative Example 2 | 15.3 | 0.06 | 80.2 | 19.8 | 13.0 | 0.55 | 80.0 | 20.0 |
| Comparative Example 3 | 17.4 | 0.05 | 75.0 | 25.0 | 0.0 | 17.50 | 75.0 | 25.0 |
| Comparative Example 4 | 16.8 | 0.05 | 80.0 | 20.0 | 0.0 | 18.40 | 80.0 | 20.0 |
| Comparative Example 5 | [3](98.9) | 0.13 | 90.0 | 10.0 | 0.0 | 16.00 | [4](75.3) | [4](24.7) |

(b)

Core-shell type polymer particle (composition)

| | Conver- | Average particle | Polymer composition | Seed | reduced visco- | Oxygen |

TABLE 1-continued

| | sion (%) | diameter (μm) | (%)[2] AN | (%)[2] MA | content (%) | MI (g/10 min) | sity (dl/g) | permeability (CCμ/Dm² atm) |
|---|---|---|---|---|---|---|---|---|
| Example 1 | 96.1 | 0.19 | 80.3 | 19.7 | 10.1 | 13.0 | 1.57 | 200 |
| Example 2 | 95.7 | 0.23 | 80.0 | 20.0 | 10.3 | 15.8 | 0.58 | 220 |
| Example 3 | 92.6 | 0.21 | 83.0 | 17.0 | 10.5 | 3.3 | 1.07 | 130 |
| Example 4 | 93.9 | 0.23 | 77.1 | 22.9 | 10.6 | 6.1 | 1.49 | 270 |
| Example 5 | 94.8 | 0.19 | 80.0 | 20.0 | 11.0 | 17.6 | 1.27 | 250 |
| Example 6 | 92.7 | 0.21 | 80.4 | 19.6 | 15.8 | 18.4 | 2.11 | 210 |
| Comparative Example 1 | 96.0 | 0.15 | 75.0 | 25.0 | 20.0 | 25.6 | 0.49 | 450 |
| Comparative Example 2 | 93.7 | 0.14 | 80.0 | 20.0 | 15.3 | 10.5 | 0.59 | 340 |
| Comparative Example 3 | 95.0 | 0.23 | 75.0 | 25.0 | 17.2 | 0.0 | 2.29 | [6]— |
| Comparative Example 4 | 97.2 | 0.22 | 80.0 | 20.0 | 16.5 | 0.0 | 1.97 | [7]— |
| Comparative Example 5 | 96.0 | 0.15 | 76.8 | 23.2 | [5](10.4) | 14.3 | 1.35 | [8]— |

[1] Contains an intermediate layer.
[2] AN = Acrylonitrile component, MA = methyl acrylate component.
[3] The conversion of a core polymer alone.
[4] The composition of a low-nitrile polymer in a polyblend.
[5] The content of a high-nitrile polymer in a polyblend.
[6], [7] Had no melt-flowability. Accordingly, no film could be obtained.
[8] Breakage occurred during biaxial orientation. Accordingly, no film could be obtained.

TABLE 2

(a)

| | Core polymer[1] | | | | Shell layer polymer[2] | |
|---|---|---|---|---|---|---|
| | Conversion (%) | Average particle diameter (μm) | Polymer composition (%)[3] AN | Polymer composition (%)[3] MA | Polymer composition (%)[3] AN | Polymer composition (%)[3] MA |
| Example 8 | 10.6 | 0.24 | 90.1 | 9.9 | 78.9 | 21.1 |
| Example 9 | 10.5 | 0.21 | 90.1 | 9.9 | 79.1 | 20.9 |
| Example 10 | 10.3 | 0.24 | 94.8 | 5.2 | 78.8 | 21.2 |
| Example 11 | 11.2 | 0.26 | 90.0 | 10.0 | 81.7 | 18.3 |
| Comparative Example 8 | 10.5 | 0.27 | 80.0 | 20.0 | 80.0 | 20.0 |
| Comparative Example 9 | 10.1 | 0.25 | 80.1 | 19.9 | 80.0 | 20.0 |

(b) Core-shell type polymer particle (composition)

| | Conversion (%) | Average particle diameter (μm) | Polymer composition (%)[3] AN | Polymer composition (%)[3] MA | Rubber component (%) | Graft resin[4] (%) | High-nitril resin (%) | MI (g/10 min) | reduced viscosity (dl/g) | Oxygen permeability (CCμ/Dm² atm) |
|---|---|---|---|---|---|---|---|---|---|---|
| Example 8 | 91.8 | 0.48 | 80.2 | 19.8 | 5.4 | 4.8 | 11.5 | 16.3 | 0.55 | 277 |
| Example 9 | 97.8 | 0.37 | 80.3 | 19.7 | 10.2 | 8.5 | 10.7 | 7.5 | 0.64 | 400 |
| Example 10 | 90.2 | 0.49 | 80.6 | 19.4 | 5.5 | 4.3 | 11.4 | 9.6 | 0.54 | 295 |
| Example 11 | 94.3 | 0.46 | 82.7 | 19.9 | 5.3 | 4.0 | 11.9 | 5.6 | 0.61 | 284 |
| Comparative Example 8 | 93.8 | 0.48 | 80.0 | 20.0 | 5.3 | 4.6 | — | 4.5 | 0.59 | 558 |
| Comparative Example 9 | 92.2 | 0.38 | 80.0 | 20.0 | 10.8 | 8.7 | — | 1.7 | 0.75 | 588 |

[1] Consists of a rubber component and a high-nitrile resin.
[2] Consists of a low-nitrile resin containing an intermediate layer.
[3] AN = Acrylonitrile component, MA = methyl acrylate component.
[4] Contains no rubber component.

TABLE 3

(a)

| | Core polymer | | | | | | | Shell layer polymer[1] | | |
|---|---|---|---|---|---|---|---|---|---|---|
| | Conversion (%) | Average particle diameter (μm) | polymer composition (%)[2] AN | polymer composition (%)[2] MA | polymer composition (%)[2] ST | MI (g/10 min) | Reduced viscosity (dl/g) | Polymer composition (%)[2] AN | Polymer composition (%)[2] MA | Polymer composition (%)[2] ST |
| Example 13 | 10.0 | 0.06 | 90.1 | 9.9 | — | 0.0 | 18.90 | 70.9 | 3.2 | 25.9 |
| Example 14 | 10.3 | 0.07 | 90.3 | 9.7 | — | 0.0 | 0.54 | 70.0 | 3.1 | 26.9 |
| Example 15 | 11.2 | 0.06 | 94.7 | 5.3 | — | 0.0 | 15.00 | 67.6 | 1.5 | 30.9 |
| Example 16 | [3](98.9) | 0.13 | 90.0 | 10.0 | — | 0.0 | 16.00 | 69.5 | — | 30.5 |
| Example 17 | 15.9 | 0.06 | 90.0 | 10.0 | — | 0.0 | 18.50 | 69.1 | 2.5 | 28.4 |
| Comparative Example 11 | 3.2 | 0.04 | 70.1 | — | 29.9 | 0.0 | 15.40 | 70.4 | — | 29.6 |

TABLE 3-continued

| | | | | | | | | | |
|---|---|---|---|---|---|---|---|---|---|
| Comparative Example 12 | 10.5 | 0.05 | 70.0 | 30.0 | — | 60.0 | 0.60 | 72.1 | 9.3 | 18.6 |
| Comparative Example 13 | 3.5 | 0.05 | 70.2 | — | 29.8 | 4.5 | 0.55 | 70.3 | — | 29.7 |
| Comparative Example 14 | 3)(98.9) | 0.13 | 90.0 | 10.0 | — | 0.0 | 16.00 | 4)(70.3) | — | 4)(29.7) |

(b) Core-shell type polymer particle (composition)

| | Conversion (%) | Average particle diameter (μm) | Polymer composition (%)2) AN | MA | ST | Seed content (%) | MI (g/10 min) | reduced viscosity (dl/g) | Oxygen permeability (CCμ/Dm² atm) |
|---|---|---|---|---|---|---|---|---|---|
| Example 13 | 79.7 | 0.21 | 73.3 | 4.0 | 22.7 | 12.3 | 11.9 | 1.52 | 1600 |
| Example 14 | 80.7 | 0.17 | 72.5 | 3.9 | 23.6 | 12.5 | 6.5 | 0.60 | 1800 |
| Example 15 | 78.1 | 0.19 | 71.4 | 2.0 | 26.6 | 14.0 | 5.4 | 1.79 | 1900 |
| Example 16 | 71.5 | 0.24 | 72.0 | 1.3 | 26.7 | 12.8 | 14.2 | 1.42 | 2000 |
| Example 17 | 81.5 | 0.20 | 73.2 | 4.0 | 22.8 | 19.5 | 6.0 | 2.15 | 1300 |
| Comparative Example 11 | 78.6 | 0.17 | 70.4 | — | 29.6 | 4.2 | 0.8 | 1.42 | 6)— |
| Comparative Example 12 | 80.8 | 0.16 | 71.8 | 12.0 | 16.2 | 13.0 | 11.3 | 0.72 | 2500 |
| Comparative Example 13 | 80.4 | 0.15 | 70.3 | — | 29.7 | 4.5 | 6.1 | 0.55 | 2900 |
| Comparative Example 14 | 80.2 | 0.15 | 72.6 | 1.3 | 26.1 | 5)(11.7) | 2.5 | 1.56 | 7)— |

1)Contains an intermediate layer.
2)AN = Acrylonitrile component, MA = methyl acrylate component, ST = styrene component.
3)The conversion of a core polymer alone.
4)The composition of a low-nitrile polymer in a polyblend.
5)The content of a high-nitrile polymer in a polyblend.
6), 7)Had no melt-flowability. Accordingly, no film could be obtained.
8)Breakage occurred during biaxial orientation. Accordingly, no film could be obtained.

TABLE 4

(a)

| | Core polymer1) | | | | | Shell layer polymer2) | | |
|---|---|---|---|---|---|---|---|---|
| | Conversion (%) | Average particle diameter (μm) | Polymer composition (%)3) AN | MA | ST | Polymer composition (%)3) AN | MA | ST |
| Example 19 | 10.4 | 0.23 | 90.0 | 10.0 | — | 70.1 | 3.1 | 26.8 |
| Example 20 | 10.5 | 0.20 | 90.1 | 9.9 | — | 70.4 | 3.1 | 26.5 |
| Example 21 | 10.3 | 0.24 | 95.0 | 5.0 | — | 67.3 | 1.6 | 31.1 |
| Example 22 | 15.7 | 0.25 | 90.2 | 9.8 | — | 69.2 | 2.6 | 28.2 |
| Comparative Example 16 | 3.2 | 0.20 | 70.2 | — | 29.8 | 71.5 | — | 28.5 |
| Comparative Example 17 | 9.4 | 0.24 | 70.2 | 29.8 | — | 73.1 | 9.7 | 17.2 |

(b) Core-shell type polymer particle (composition)

| | Conversion (%) | Average particle diameter (μm) | Polymer composition (%)3) AN | MA | ST | Rubber component (%) | Graft resin4) (%) | High-nitril resin (%) | MI (g/10 min) | reduced viscosity (dl/g) | Oxygen permeability (CCμ/Dm² atm) |
|---|---|---|---|---|---|---|---|---|---|---|---|
| Example 19 | 81.5 | 0.45 | 72.6 | 4.0 | 23.4 | 6.1 | 4.8 | 12.7 | 5.3 | 0.55 | 2400 |
| Example 20 | 80.8 | 0.38 | 73.0 | 4.0 | 23.0 | 12.4 | 8.9 | 13.0 | 4.0 | 0.58 | 2100 |
| Example 21 | 82.5 | 0.49 | 71.4 | 2.0 | 25.3 | 6.1 | 4.3 | 12.5 | 6.8 | 0.54 | 2500 |
| Example 22 | 82.3 | 0.47 | 73.2 | 4.0 | 22.8 | 6.2 | 5.0 | 19.0 | 3.6 | 0.54 | 1800 |
| Comparative Example 16 | 80.2 | 0.42 | 71.4 | — | 28.6 | 6.2 | 3.1 | — | 6.7 | 0.59 | 4100 |
| Comparative Example 17 | 80.9 | 0.40 | 72.8 | 12.0 | 15.2 | 6.2 | 5.2 | — | 1.2 | 0.58 | 3600 |

1)Consists of a rubber component and a high-nitrile resin.
2)Consists of a low-nitrile resin containing an intermediate layer.
3)AN = Acrylonitrile component, MA = methyl acrylate component, ST = styrene component.
4)Contains no rubber component.

TABLE 5

| | Film tensil strength (kg/mm²) | | Film tensil elongation (%) | | Flexural modulus (kg/cm²) | Flexural strength (kg/cm²) |
|---|---|---|---|---|---|---|
| | Lengthwise | Crosswise | Lengthwise | Crosswise | | |
| Example 7 | 6.8 | 6.6 | 23.1 | 24.0 | 43 × 10³ | 840 |
| Comparative Example 6 | 6.7 | 6.7 | 6.3 | 7.2 | 41 × 10³ | 690 |

TABLE 5-continued

| | Film tensil strength (kg/mm$^2$) | | Film tensil elongation (%) | | Flexural modulus (kg/cm$^2$) | Flexural strength (kg/cm$^2$) |
|---|---|---|---|---|---|---|
| | Lengthwise | Crosswise | Lengthwise | Crosswise | | |
| Comparative Example 7[1)] | — | — | — | — | 37 × 10$^3$ | 420 |
| Example 12 | 6.5 | 6.7 | 50.1 | 57.3 | 38 × 10$^3$ | 900 |
| Comparative Example 10 | 6.6 | 6.5 | 30.5 | 32.1 | 35 × 10$^3$ | 740 |
| Example 18 | 7.2 | 6.8 | 31.5 | 30.4 | 38 × 10$^3$ | 760 |
| Comparative Example 15[1)] | — | — | — | — | 34 × 10$^3$ | 520 |
| Example 23 | 6.6 | 6.5 | 47.2 | 51.0 | 40 × 10$^3$ | 850 |
| Comparative Example 18 | 6.6 | 6.4 | 25.1 | 27.9 | 38 × 10$^3$ | 660 |

[1)]Film broke at the time of orientation.

We claim:

1. A polymer composition comprising
2-50 parts by weight of a fine particles component dispersed in a matrix described later, of (la) a nitrile polymer consisting essentially of a polymeric unit represented by the following formula (a)

($R^1$ is a hydrogen atom or a methyl group), or (1b) a high-nitrile copolymer consisting essentially of the polymeric unit (a) and a polymeric unit represented by the following formula (b)

($R^2$ is a hydrogen atom or a methyl group, and $R^3$ is an alkyl group of 1-6 carbon atoms), wherein the proportion of the polymeric unit (a) is at least 86% by weight based on the total of the polymeric unit (a) and the polymeric unit (b), and 98-50 parts by weight of a matrix of (2a) a low-nitrile copolymer consisting essentially of the polymeric unit (a) and the polymeric unit (b), wherein the proportion of the polymeric unit (a) is 50-85% by weight based on the total of the polymeric unit (a) and the polymeric unit (b), or (2b) a low-nitrile copolymer consisting essentially of the polymeric unit (a) and a polymeric unit represented by the following formula (c)

($R^4$ is a hydrogen atom or a methyl group and $R^5$ is a phenyl group), wherein the proportion of the polymeric unit (a) is 50-85% by weight based on the total of the polymeric unit (a) and the polymeric unit (c), or (2c) a low-nitrile copolymer consisting essentially of the polymeric unit (a), the polymeric unit (b) and the polymeric unit (c), wherein the proportion of the polymeric unit (a) is 50-85% by weight and the polymeric unit (b) and the polymeric unit (c) occupy the remaining portion.

2. A polymer composition comprising
3-50 parts by weight of a fine particles component dispersed in a matrix described later, comprising 1-15 parts by weight of (1a) a nitrile polymer comprising a polymeric unit represented by the following formula (a)

($R^1$ is a hydrogen atom or a methyl group), or (1b) a high-nitrile copolymer consisting essentially of the polymeric unit (a) and a polymeric unit represented by the following formula (b)

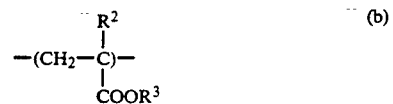

($R^2$ is a hydrogen atom or a methyl group, and $R^3$ is an alkyl group of 1-6 carbon atoms), wherein the proportion of the polymeric unit (a) is at least 86% by weight based on the total of the polymeric unit (a) and the polymeric unit (b), and 2-35 parts by weight of (1c) a graft polymer obtained by grafting 1-15 parts by weight of a nitrile polymer consisting essentially of the polymeric unit (a) or a high-nitrile copolymer consisting essentially of the polymeric unit (a) and the polymeric unit (b), wherein the proportion of the polymeric unit (a) is at least 86% by weight based on the total of the polymeric unit (a) and the polymeric unit (b), onto 1-20 parts by weight of a synthetic rubber containing 50% by weight or more of a 1,3-conjugated diene, and 97-50 parts by weight of a matrix of (2a) a low-nitrile copolymer, consisting essentially of the polymeric unit (a) and the polymeric unit (b), wherein the proportion of the polymeric unit (a) is 50-85% by weight based on the total of the polymeric unit (a) and the polymeric unit (b), or (2b) a low-nitrile copolymer consisting essentially of the polymeric unit (a) and a polymeric unit represented by the following formula (c)

($R^4$ is a hydrogen atom or a methyl group, and $R^5$ is a phenyl group), wherein the proportion of the polymeric unit (a) is 50–85% by weight based on the total of the polymeric unit (a) and the polymeric unit (c), or (2c) a low-nitrile copolymer consisting essentially of the polymeric unit (a), the polymeric unit (b) and the polymeric unit (c), wherein the proportion of the polymeric unit (a) is 50–85% by weight and the polymeric unit (b) and the polymeric unit (c) occupy the remaining portion.

3. The polymer composition according to claim 1, wherein the polymeric unit (a) constituting the nitrile polymer (1a) or the high-nitrile copolymer (1b) is a polymeric unit consisting of an acrylonitrile.

4. The polymer composition according to claim 1, wherein the polymeric unit (b) constituting the high-nitrile copolymer (1b) is a polymeric unit consisting of a methyl acrylate.

5. The polymer composition according to claim 1, wherein the polymeric unit (a) constituting the low-nitrile copolymer (2a), (2b) or (2c) is a polymeric unit consisting of a acrylonitrile, the polymeric unit (b) constituting the low-nitrile copolymer (2a), (2b) or (2c) is a polymeric unit consisting of methyl acrylate and the polymeric unit (c) constituting the low-nitrile copolymer (2b) or (2c) is a polymeric unit consisting of styrene.

6. The polymer composition according to claim 1, wherein the nitrile polymer of high-nitrile copolymer comprises 2–40% by weight of the polymer composition.

7. The polymer composition according to claim 1, wherein the nitrile polymer of high-nitrile copolymer has a reduced viscosity of 0.5–50 dl/g as measured at 30° C. in dimethylformamide.

8. The polymer composition according to claim 1, wherein the nitrile polymer of high-nitrile copolymer has a melt index of 2 g/10 min. or less.

9. The polymer composition according to claim 1, having a reduced viscosity of 0.3–5 dl/g as measured at 30° C. in dimethylformamide.

10. The polymer composition according to claim 2, having a reduced viscosity of 0.4–5 dl/g as measured at 30° C. in dimethylformamide.

11. The polymer composition according to claim 1, or 2, having a melt index of 2–50 g/10 min.

12. The polymer composition according to claim 1, wherein the content of the polymeric unit (a) of the nitrile polymer or the high-nitrile copolymer is larger by at least 2% by weight than the content of the polymeric unit (a) of the low-nitrile copolymer.

13. A molded article obtained by subjecting the polymer composition of claim 1 to melt molding.

14. The molded article according to claim 13, which is a film, a sheet or a vessel.

15. The molded article according to claim 13, which is a film oriented at least unidirectionally.

16. The polymer composition according to claim 13, which is a film or bottle wherein the dispersed fine particles component is dispersed in the matrix, i.e. the low-nitrile copolymer in a unidirectionally extended form or a planar form.

17. The polymer composition according to claim 13, wherein the content of the polymeric unit (a) of the nitrile polymer or the high-nitrile copolymer is larger by at least 2% by weight than the content of the polymeric unit (a) of the low-nitrile copolymer.

18. The polymer composition according to claim 2, wherein the polymeric unit (a) constituting the nitrile polymer (1a) or the high-nitrile copolymer (1b) is a polymeric unit consisting of an acrylonitrile.

19. The polymer composition according to claim 2, wherein the polymeric unit (b) constituting the high-nitrile copolymer (1b) is a polymeric unit consisting of a methyl acrylate.

20. The polymer composition according to claim 2, wherein the polymeric unit (a) constituting the low-nitrile copolymer (2a), (2b) or (2c) is a polymeric unit consisting of an acrylonitrile, the polymeric unit (b) constituting the low-nitrile copolymer (2a), (2b) or (2c) is a polymeric unit consisting of methyl acrylate and the polymeric unit (c) constituting the low-nitrile copolymer (2b) or (2c) is a polymeric unit consisting of styrene.

21. The polymer composition according to claim 2, wherein the content of the polymeric unit (a) of the nitrile polymer or the high-nitrile polymer is larger by at least 2% by weight than the content of the polymeric unit (a) of the low-nitrile copolymer.

22. A molded article obtained by subjecting the polymer composition of claim 2 to melt molding.

23. A polymer composition comprising:
2–50 parts by weight of a fine particles component dispersed in a matrix described later, of (1a) a nitrile polymer consisting essentially of a polymeric unit represented by the following formula (a)

, $R^1$ being a hydrogen atom or a methyl group, or (1b) a high-nitrile copolymer consisting essentially of the polymeric unit (a) and a polymeric unit represented by the following formula (b)

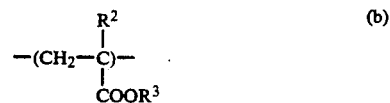

, $R^2$ being a hydrogen atom or a methyl group and $R^3$ being an alkyl group of 1–6 carbon atoms, wherein the proportion of the polymeric unit (a) is at least 86% by weight based on the total of the polymeric unit (a) and the polymeric unit (b), and
98–50 parts by weight of a matrix of (2a) a low-nitrile copolymer consisting essentially of the polymeric unit (a) and the polymeric unit (b), wherein the proportion of the polymeric unit (a) is 50–85% by weight based on the total of the polymeric unit (a) and the polymeric unit (b).

24. A polymer composition comprising:
3–50 parts by weight of a fine particles component dispersed in a matrix described later, comprising 1–15 parts by weight of (1a) a nitrile polymer consisting essentially of a polymeric unit represented by the following formula (a)

$R^1$ being a hydrogen atom or a methyl group, or (1b) a high-nitrile copolymer consisting essentially of the polymeric unit (a) and a polymeric unit represented by the following formula (b)

$R^2$ being a hydrogen atom or a methyl group, and $R^3$ being an alkyl group of 1-6 carbon atoms, wherein the proportion of the polymeric unit (a) is at least 86% by weight based on the total of the polymeric unit (a) and the polymeric unit (b), and 2-35 parts by weight of (1c) a graft polymer obtained by grafting 1-15 parts by weight of a nitrile polymer consisting essentially of the polymeric unit (a) or a high-nitrile copolymer consisting essentially of the polymeric unit (a) and the polymeric unit (b), wherein the proportion of the polymeric unit (a) is at least 86% by weight based on the total of the polymeric unit (a) and the polymeric unit (b), onto 1-20 parts by weight of a synthetic rubber containing 50% by weight or more of a 1,3-conjugated diene, and 97-50 parts by weight of a matrix of (2a) a low-nitrile copolymer consisting essentially of the polymeric unit (a) and the polymeric unit (b), wherein the proportion of the polymeric unit (a) is 50-85% by weight based on the total of the polymeric unit (a) and the polymeric unit (b).

25. A polymer composition comprising:

2-50 parts by weight of a fine particles component dispersed in a matrix and an intermediate layer located between the fine particles and the matrix, said fine particles comprising (1a) a nitrile polymer consisting essentially of a polymeric unit represented by the following formula (a)

$R^1$ being a hydrogen atom or a methyl group, or (1b) a high-nitrile copolymer consisting essentially of the polymeric unit (a) and a polymeric unit represented by the following formula (b)

$R^2$ being a hydrogen atom or a methyl group and $R^3$ being an alkyl group of 1-6 carbon atoms, wherein the proportion of the polymeric unit (a) is at least 86% by weight based on the total of the polymeric unit (a) and the polymeric unit (b);

said matrix comprising 98-50 parts by weight of a matrix of (2a) a low-nitrile copolymer consisting essentially of the polymeric unit (a) and the polymeric unit (b), wherein the proportion of the polymeric unit (a) is 50-85% by weight based on the total of the polymeric unit (a) and the polymeric unit (b), or (2b) a low-nitrile polymer consisting essentially of the polymeric unit (a) and a polymeric unit represented by the following formula (c)

$R^4$ being a hydrogen atom or a methyl group and $R^5$ being a phenyl group, wherein the proportion of the polymeric unit (a) is 50-85% by weight based on the total of the polymeric unit (a) and the polymeric unit (c), or (2c) a low-nitrile copolymer consisting essentially of the polymeric unit (a), the polymeric unit (b) and the polymeric unit (c), wherein the proportion of the polymeric unit (a) is 50-85% by weight and the polymeric unit (b) and the polymeric unit (c) occupy the remaining portion; and said intermediate layer being constituted by the same polymeric unit as constituting the matrix and the proportion of the polymeric unit (a) in the intermediate layer being 50-85% by weight but being larger than the proportion of the polymeric unit (a) in the matrix.

26. The copolymer composition according to claim 25, wherein the proportion of the polymeric unit (a) in the intermediate layer is larger at the portion of the intermediate layer closer to the dispersed fine particles component.

27. A polymer composition comprising:

3-50 parts by weight of a fine particles component dispersed in a matrix and an intermediate layer located between the fine particles and the matrix, said fine particles comprising 1-15 parts by weight of (1a) a nitrile polymer consisting essentially of a polymeric unit represented by the following formula (a)

$R^1$ being a hydrogen atom or a methyl group, or (1b) a high-nitrile copolymer consisting essentially of the polymeric unit (a) and a polymeric unit presented by the following formula (b)

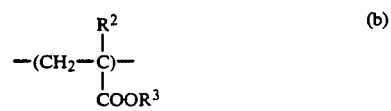

$R^2$ being a hydrogen atom or a methyl group and $R^3$ being an alkyl group of 1-6 carbon atoms, wherein the proportion of the polymeric unit (a) is at least 86% by weight based on the total of the polymeric unit (a) and the polymeric unit (b), and 2-35 parts by weight of (1c) a graft polymer obtained by grafting 1-15 parts by weight of a nitrile polymer consisting essentially of the polymeric unit (a) or a high-nitrile copolymer consisting essentially of the polymeric unit (a) and the polymeric unit (b), wherein the proportion of the polymeric unit (a) is at least 86% by weight based on the total of the polymeric unit (a) and the polymeric unit (b), onto 1-20 parts by weight of a synthetic rubber containing 50% by weight or more o a 1,3-conjugated diene;

said matrix comprising 97-50 parts by weight of a matrix of (2a) a low-nitrile copolymer consisting essentially of the polymeric unit (a) and the polymeric unit (b), wherein the proportion of the polymeric unit (a) is 50-85% by weight based on the total of the polymeric unit (a) and the polymeric unit (b), or (2b) a low-nitrile copolymer consisting essentially of the polymeric unit (a) and a polymeric unit represented by the following formula (c)

, $R^4$ being a hydrogen atom or a methyl group and $R^5$ being a phenyl group, wherein the proportion of the polymeric unit (a) is 50-85% by weight based on the total of the polymeric unit (a) and the polymeric unit (c), or (2c) a low-nitrile copolymer consisting essentially of the polymeric unit (a), the polymeric unit (b) and the polymeric unit (c), wherein the proportion of the polymeric unit (a) is 50-85% by weight and the polymeric unit (b) and the polymeric unit (c) occupy the remaining portion; and said intermediate layer being constituted by the same polymeric units as constituting the matrix and the proportion of the polymeric unit (a) in the intermediate layer being 50-85% by weight but being larger than the proportion of the polymeric unit (a) in the matrix.

* * * * *

UNITED STATES PATENT AND TRADEMARK OFFICE
CERTIFICATE OF CORRECTION

PATENT NO. : 5 278 234
DATED : January 11, 1994
INVENTOR(S) : Akio Nishino et al It is certified that error appears in the above-identified patent and that said Letters Patent is hereby corrected as shown below:

```
Column 30, lines 26 and 27;  change "comprising" to
                             ---consisting essentially of---.
Column 30, line 61;  delete the comma (,).
Column 31, line 30;  change "a" to ---an---.
Column 32, line 27;  change "polymer" (second occurrence)
                     to ---copolymer---.
Column 34, line  9;  change "polymer" to ---copolymer---.
Column 34, line 32;  change "unit" to ---units---.

Column 35, line 13;  change "o" to ---of---.
```

Signed and Sealed this

Eleventh Day of October, 1994

Attest:

BRUCE LEHMAN

*Attesting Officer*  *Commissioner of Patents and Trademarks*